(12) United States Patent
Knoblett et al.

(10) Patent No.: US 12,066,216 B2
(45) Date of Patent: Aug. 20, 2024

(54) WATER HEATER BUILDING MANAGEMENT SYSTEM GATEWAY

(71) Applicant: RINNAI AMERICA CORPORATION, Peachtree City, GA (US)

(72) Inventors: Michael Scott Knoblett, Newnan, GA (US); John-Mark Peckham, Peachtree City, GA (US); Iain Twiss, Stockport (GB)

(73) Assignee: Rinnai America Corporation, Peachtree City, GA (US)

( * ) Notice: Subject to any disclaimer, the term of this patent is extended or adjusted under 35 U.S.C. 154(b) by 375 days.

(21) Appl. No.: 17/554,462

(22) Filed: Dec. 17, 2021

(65) Prior Publication Data
US 2022/0196292 A1    Jun. 23, 2022

Related U.S. Application Data

(60) Provisional application No. 63/128,625, filed on Dec. 21, 2020.

(51) Int. Cl.
| | |
|---|---|
| *F24H 15/443* | (2022.01) |
| *F24H 15/457* | (2022.01) |
| *G05B 19/042* | (2006.01) |
| *F24H 1/10* | (2022.01) |

(52) U.S. Cl.
CPC ......... *F24H 15/443* (2022.01); *F24H 15/457* (2022.01); *G05B 19/042* (2013.01); *F24H 1/10* (2013.01); *G05B 2219/25011* (2013.01)

(58) Field of Classification Search
CPC ........ F24H 1/10; F24H 15/443; F24H 15/457; G05B 19/042; G05B 2219/25011; H04L 12/2823; H04L 12/283
See application file for complete search history.

(56) References Cited

U.S. PATENT DOCUMENTS

| | | | |
|---|---|---|---|
| 2004/0133314 A1* | 7/2004 | Ehlers | F24F 11/523 705/412 |
| 2011/0211584 A1* | 9/2011 | Mahmoud | H04L 12/2838 370/401 |
| 2012/0316808 A1* | 12/2012 | Frader-Thompson | G01R 21/00 702/61 |
| 2017/0250833 A1* | 8/2017 | Morizono | H04L 12/28 |

* cited by examiner

*Primary Examiner* — Kidest Bahta
(74) *Attorney, Agent, or Firm* — Quinn IP Law (57) ABSTRACT

A building management system (BMS) gateway comprises a BMS router and a water heater hub configured to be communicatively coupled to a plurality of water heaters. The BMS router facilitates communication of status and control data between a BMS and the water heaters connected to the water heater hub. Connecting multiple water heaters to a single BMS gateway provides simplified installation and networking requirements. For installations with more water heaters than are able to be coupled to the water heater hub, additional BMS gateways may be installed. Local controls for water heaters managed by the BMS are typically disabled or overwritten by the BMS to prevent changes to settings. A local BMS user interface (UI) is configured to connect with the BMS gateway(s) and facilitate secure access, display, and/or adjustment of water heater status and control data for the plurality of water heaters connected to the BMS gateway(s).

20 Claims, 10 Drawing Sheets

- TYPE — 1 HEATER — 704
- NUMBER — 2 HEATERS — 702
- UNITS — IMPERIAL UNITS — 706
- EMAIL ALARMS — YES — 708
- SETPOINT HEATER 1 — RANGE A — 710
- SETPOINT HEATER 2 — RANGE A — 712

- RACK ID — NONE — 802
- PREVIOUS RACK ADDRESS — 804
- NEXT RACK ADDRESS — 806
- PASSCODE — 0151 — 808

WATER HEATER BUILDING MANAGEMENT SYSTEM GATEWAY

BACKGROUND

Building management and automation continues to evolve to provide convenient and simple monitoring and control of various mechanical and electrical equipment within a building through a building management system (BMS). A BMS provides convenience of centralized control of a network of mechanical and electrical equipment distributed throughout a residential or commercial building. The BMS can monitor and control water heaters, heating, ventilation and air conditioning (HVAC), lighting, shading, security, appliances, door locks, and audiovisual (AV) equipment, among others throughout a facility.

SUMMARY

A first aspect of the disclosure includes an appliance system that comprises a building management system (BMS) gateway. The BMS gateway comprises an appliance hub comprising a plurality of appliance communication ports, each of the plurality of appliance communication ports configured to communicate status and control data with a respective appliance. The BMS gateway further comprises a BMS router comprising a first communications port configured to communicate status and control data of a plurality of appliances between the appliance hub and the BMS router. The BMS router further comprises a second communications port configured to communicate the status and control data of appliances connected to the plurality of appliance communication ports between the BMS router and an external BMS system remotely located from the BMS gateway.

In some implementations of the first aspect of the disclosure, the appliance system further comprises a BMS user interface (UI) positioned local to the BMS gateway. The BMS UI coupled to the BMS gateway and configured to facilitate secure access, display, and/or adjustment of the status and control data for a plurality of appliances connected to the BMS gateway.

In some implementations of the first aspect of the disclosure, the BMS UI is coupled to a primary communications port of the BMS gateway.

In some implementations of the first aspect of the disclosure, the primary communications port is an Ethernet port.

In some implementations of the first aspect of the disclosure, the second communications port is configured to communicate with the BMS via a secondary communications port of the BMS gateway.

In some implementations of the first aspect of the disclosure, the BMS UI is coupled to the primary communications port of the BMS gateway via a network switch.

In some implementations of the first aspect of the disclosure, a second BMS gateway coupled to the network switch. The BMS UI is further configured to facilitate secure access, display, and/or adjustment of the status and control data for a plurality of appliances connected to the second BMS gateway.

In some implementations of the first aspect of the disclosure, the plurality of appliances are tankless water heaters.

In some implementations of the first aspect of the disclosure, the BMS UI comprises a status screen for displaying a plurality of status areas, each displaying an operational state of a respective one of the plurality of appliances connected to the BMS gateway.

In some implementations of the first aspect of the disclosure, upon selection of one of the plurality of status areas, the BMS UI is configured to display an operational details screen for displaying and controlling operational details of the respective one of the plurality of appliances.

In some implementations of the first aspect of the disclosure, the plurality of appliances are tankless water heaters and the operational details screen is configured to control changing a setpoint temperature on the respective one of the plurality of appliances.

A second aspect of the disclosure includes a system comprising a plurality of building management system (BMS) gateways. Each BMS gateway is configured to be communicatively coupled with a rack of appliances and a BMS system remotely located from the plurality of BMS gateways. Each BMS gateway is configured to communicate status and control data between the BMS system and the rack of appliances communicatively coupled to the BMS gateway. The system further comprises a BMS user interface (UI) positioned local to and communicatively coupled to the plurality of BMS gateways. The BMS UI is configured to facilitate secure access, display, and/or adjustment of the status and control data for the rack of appliances connected to each of the plurality of BMS gateways.

In some implementations of the second aspect of the disclosure, the system further comprises a network switch positioned local to the plurality of BMS gateways. Each of the plurality of BMS gateways and the BMS UI are communicatively coupled to each other via the network switch.

In some implementations of the second aspect of the disclosure, the plurality of BMS gateways and the BMS UI are communicatively coupled to the BMS system via the network switch.

In some implementations of the second aspect of the disclosure, the BMS UI comprises status screens, each for a respective one of the plurality of BMS gateways. Each of the status screens displays a plurality of status areas. The plurality of status areas each display an operational state of a respective one of the rack of appliances communicatively coupled to the respective one of the plurality of BMS gateways.

In some implementations of the second aspect of the disclosure, the BMS UI is configured to navigate between the status screens of the plurality of BMS gateways.

In some implementations of the second aspect of the disclosure, the status screen of each of the plurality of BMS gateways comprises an identifier of the respective one of the plurality of BMS gateways.

In some implementations of the second aspect of the disclosure, upon selection of one of the plurality of status areas, the BMS UI is configured to display an operational details screen for displaying and controlling operational details of the respective one of the rack of appliances in each of a plurality of operational detail areas.

In some implementations of the second aspect of the disclosure, the rack of appliances is a rack of tankless water heaters. The operational detail areas comprise one or more of a setpoint temperature area, an error area, an error history area, a run time area, a flow rate area, a heat exchanger outlet temperature area, a combustion frequency area, or a water outlet temperature area.

In some implementations of the second aspect of the disclosure, the operational details area comprises the setpoint temperature area, and wherein the BMS UI is configured to update a setpoint temperature of the respective one of the rack of appliances communicatively coupled to the respective one of the plurality of BMS gateways.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

"Water heater" is defined herein to mean an appliance that heats water or any other appliance that one of ordinary skill in the art would recognize as capable of being monitored, controlled, or otherwise regulated by a building management system, including, but not limited to, water heaters, tankless water heaters, hybrid tankless and storage tank water heaters, hybrid gas and electric water heaters, boilers, radiator systems, air handling systems, heating, ventilation, and air conditioning systems, plumbing systems, gas systems, fire protection systems, security systems, sewer systems, electrical systems, or any other such appliance or building system.

A building management system (BMS) provides convenience of centralized control of a network of mechanical and electrical equipment distributed throughout a residential or commercial building. Typically, each piece of equipment is individually networked to the BMS. However, tankless water heaters are often installed in commercial settings in large racks or arrays where each water heater has a separate controller, resulting in complicated networking of the array of water heaters to the BMS.

A BMS gateway disclosed herein comprises a water heater hub and a BMS router. The water heater hub facilitates local networking of a plurality of water heaters and translation of water heater information to a format usable by the BMS router. The BMS router in turn facilitates communication of status and control data between the BMS and the water heaters connected to the water heater hub. Therefore, connecting multiple water heaters to a single BMS gateway provides simplified installation and networking requirements.

Status and control data may include whether a particular water heater is on or off or on standby, whether there are any errors and associated error code(s), an error history, a set point temperature, a run time, a flow rate, a combustion frequency, a heat exchange outlet temperature, and/or a water output temperature. Other status and control data are contemplated by this disclosure.

Each BMS gateway may be networked to up to a maximum number of water heaters. In an example, the maximum number of water heaters that can be networked to the BMS gateway is six. In other examples, more or fewer than six water heaters may be the maximum number of water heaters that can be networked to the BMS gateway. The plurality of water heaters connected to the BMS gateway, up to the maximum number of water heaters, is referred to herein as a rack of water heaters. However, it is understood that the rack of water heaters may be installed together on a floor-standing or wall-mounted rack system, the rack of water heaters may also be individually installed separate from a rack system (e.g., each water heater individually installed on one or more walls). Other installation configurations for a rack of water heaters are contemplated by this disclosure.

For installations with more than the maximum number of water heaters, additional BMS gateways may be installed. Each of the BMS gateways may in turn be connected to a network switch, such as via Ethernet, that is in turn connected to the BMS. Accordingly, even in large installations, the BMS gateway facilitates simplified installation and networking requirements.

As a security feature, local controls for mechanical and electrical equipment managed by the BMS are typically disabled or overwritten by the BMS to prevent unintended changes to system settings or tampering of the equipment. However, coordination with a centralized BMS may hinder local repair and servicing of the equipment by service technicians.

A local BMS user interface (UI) is disclosed herein that is configured to connect with the BMS gateway and facilitate secure access, display, and/or adjustment of water heater status and control data for the rack of water heaters connected to the BMS gateway. The local BMS UI is positioned local to the BMS gateway, such as in the same room, area, or region of a building as the BMS gateway, and in contrast to the remotely located BMS, such as in a different room, area, or region of a building. The BMS UI may be a touch screen device or other computing device with a display and a user input device, such as via a mouse or keyboard. In various implementations, the BMS UI may be a website hosted by the BMS gateway and displayed on an external device, such as a cell phone, tablet, or other device.

In various implementations, the BMS UI includes a status screen that shows the operational state of each of the water heaters in the rack of water heaters connected to the BMS gateway. For example, the operational state may be On or Off to indicate whether a water heater is turned on or off. In the On state, the water heater may have a sub-status of Heating for when the water heater is actively heating water, Standby for when the water heater is ready to begin heating water but not actively heating water, and Error for when the water heater is in an error state.

Upon selection of any of the water heaters in the status screen, an operational details screen is shown on the BMS UI. The operational details screen provides more detailed information on the operational status of the selected water heater. For example, the operational details screen shows whether there are any errors and associated error code(s), an error history, a set point temperature, a run time, a flow rate, a combustion frequency, a heat exchange outlet temperature, and/or a water output temperature.

One or more of the operational details in the operational details screen are selectable for changing a configuration of the selected water heater or obtaining more information on the operational detail. For example, the set point temperature may be selected to update the set point for the water heater. The error code may be selected to provide information on the type of error, time and date of the error, and information on a remedy for the error. The error history may be selected to provide more details on the error history of the water heater, such as the timing and type of past errors for the water heater.

The BMS UI facilitates configuration of the BMS gateway with the water heaters connected thereto. For example, a rack configuration screen of the BMS UI is used to configure the type of water heaters in a rack of water heaters connected to the BMS gateway, the number of water heaters in the rack of water heaters, the type of units to display on the BMS UI (e.g., Imperial or Metric units), whether the BMS UI is to send e-mail alarms of errors or operational changes (e.g., changes to the set point on a water heater), and a setpoint for each of the heaters in the rack of water heaters.

In large installations, when multiple BMS gateways are networked together through a switch, a single local UI panel may also be connected to the switch to facilitate local display and adjustment of water heater operational status and settings for all of the water heaters in the installation. In such installations, a rack system configuration screen of the BMS UI is used to configure a rack identification (ID) for each of the BMS gateways, a previous rack address, and a next rack address, as well as a passcode for logging in to the BMS gateway.

While disclosed herein with the example of water heaters, the BMS gateway is contemplated to similarly work with other arrays or redundant systems to which a BMS is connected. Moreover, the BMS gateway is contemplated to similarly work with any other appliance that one of ordinary skill in the art would recognize as capable of being monitored, controlled, or otherwise regulated by a building management system, including, but not limited to, water heaters, tankless water heaters, hybrid tankless and storage tank water heaters, hybrid gas and electric water heaters, boilers, radiator systems, air handling systems, heating, ventilation, and air conditioning systems, plumbing systems, gas systems, fire protection systems, security systems, sewer systems, electrical systems, or any other such appliance or building system. Each of the features described above are contemplated to be used in isolation or any combination together.

Figure 1:
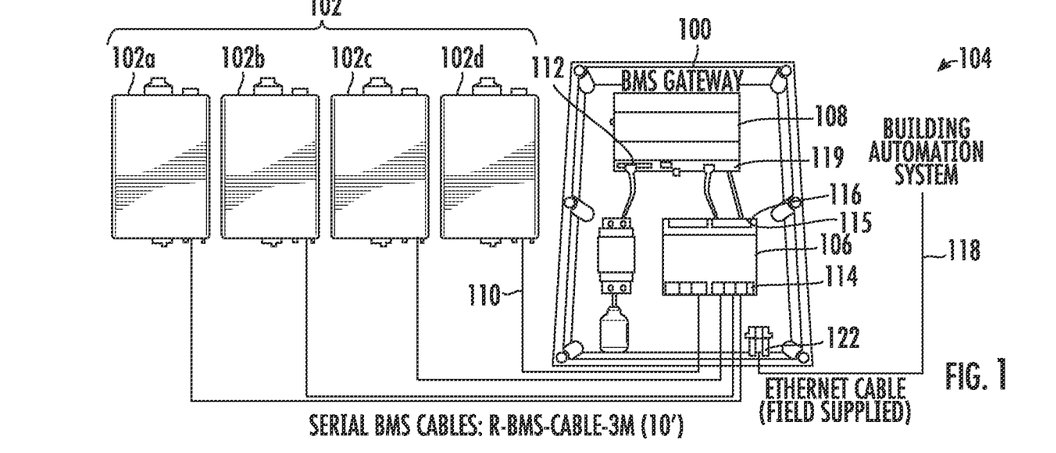
FIG. 1 is a building management system (BMS) gateway connecting a plurality of water heaters to a BMS suitable for implementing the several embodiments of the disclosure.

FIG. 1 is a building management system (BMS) gateway 100 connecting a plurality of water heaters 102 to a BMS 104 suitable for implementing the several embodiments of the disclosure. In the example shown, there are four water heaters 102a, 102b, 102c, 102d (collectively the plurality of water heaters 102). More or fewer water heaters may be included in the plurality of water heaters 102.

The BMS gateway 100 comprises a water heater hub 106 and a BMS router 108. The water heater hub 106 facilitates local networking of the plurality of water heaters 102 and translation of water heater information to a format usable by the BMS router 108.

In the example shown, each of the plurality of water heaters 102 is connected to the water heater hub 106 by a communication cable 110, such as a serial bus cable. A controller (not shown) on each of the plurality of water heaters 102 has a communications port for communicating status and control data over the communication cable 110 with the water heater hub 106. Likewise, the water heater hub 106 has a plurality of appliance communication ports input/output (I/O) ports or 114, one for each of the plurality of water heaters 102 up to a maximum number of I/O ports 114. In the example shown, the water heater hub 106 has six I/O ports 114 for connecting with up to six water heaters. Other numbers of I/O ports 114 may be used. Alternatively, the plurality of water heaters 102 may be connected to the water heater hub 106 by a wireless communication channel, such as BLUETOOTH or WIFI.

Figure 2:
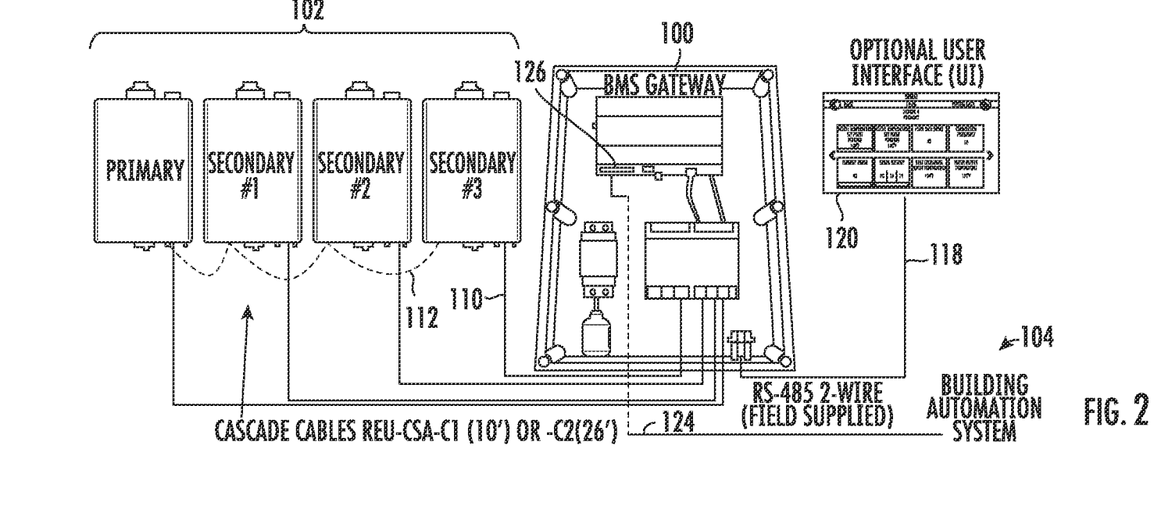
FIG. 2 is a BMS gateway connecting a plurality of cascade controlled water heaters to a BMS and a local BMS user interface (UI) suitable for implementing the several embodiments of the disclosure.

In the example shown in FIG. 1, each of the plurality of water heaters 102 are individually connected to the water heater hub 106. In other examples, such as shown in FIG. 2, the plurality of water heaters 102 may be serially connected together with cascade cables 112. In such an example, the plurality of water heaters 102 may communicate amongst each other via the cascade cables 112 and communicate with the water heater hub 106 via respective ones of the communication cable 110. A communication cable 116 facilitates communication of data between an I/O port 115 on the water heater hub 106 and an I/O port 117 on the BMS router 108. In various examples, the communication cable 116 is an RS-485 cable, Ethernet cable, or other such communications cable. In some implementations, a wireless communication channel may facilitate communication between the water heater hub 106 and the BMS router 108.

Figure 3:
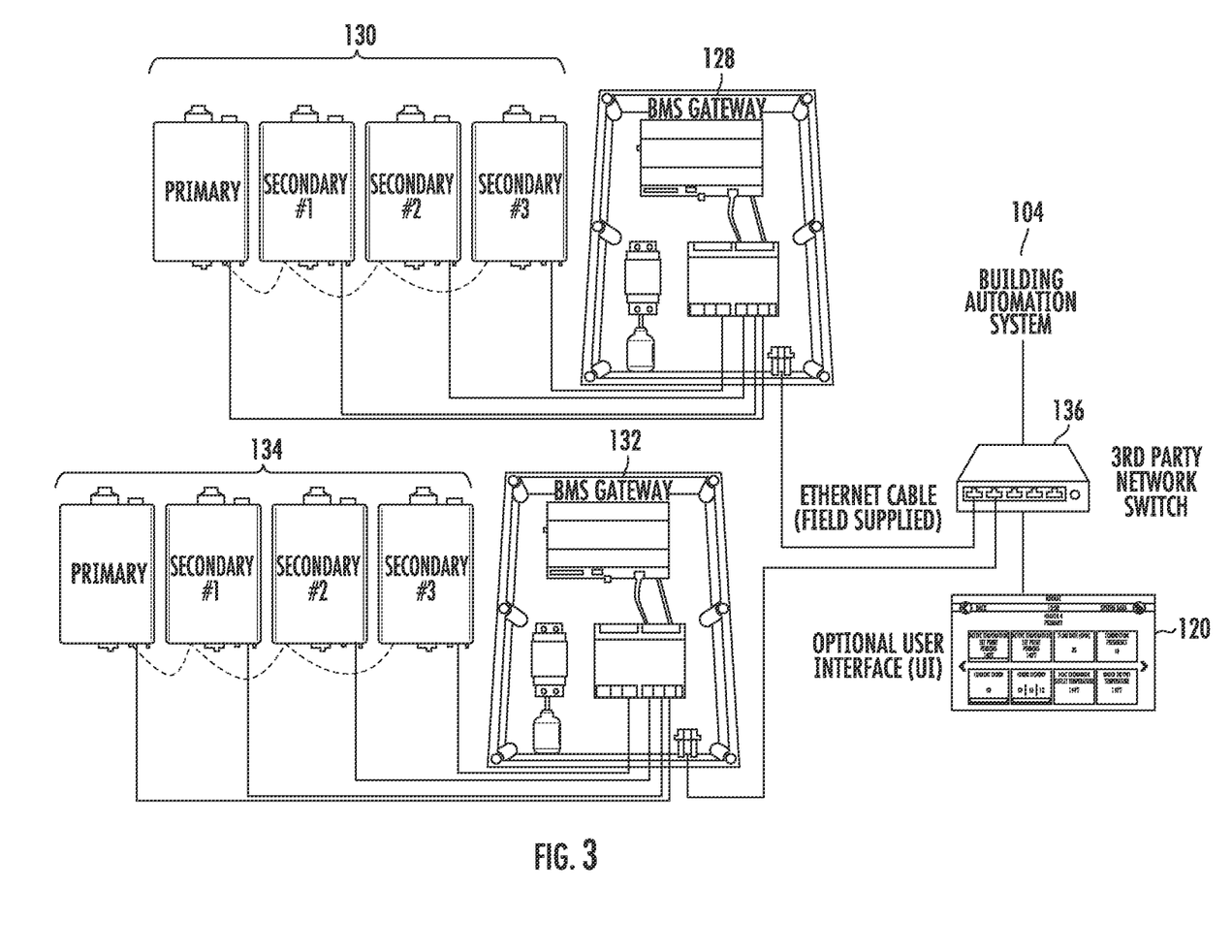
FIG. 3 is a plurality of BMS gateways connected through a network switch to a BMS suitable for implementing the several embodiments of the disclosure.

The BMS router 108 facilitates communication of status and control data between the BMS 104 and the plurality of water heaters 102 connected to the water heater hub 106. A communication cable 118, such as an Ethernet cable, connects the BMS router 108 and the BMS gateway 100. In the examples shown in FIGS. 1-3, a primary communication port 122, such as an Ethernet, is provided on the BMS gateway 100 for communications between the BMS gateway 100 and external devices, such as the BMS 104. A communications port 119, such as an Ethernet port, on the BMS router 108 is connected to the primary communication port 122. Other configurations are contemplated by this disclosure. Therefore, connecting the plurality of water heaters 102 to a single BMS gateway 100 via the water heater hub 106 and BMS router 108 provides simplified installation and networking requirements for communication of status and control data between the plurality of water heaters 102 and the BMS 104.

Status and control data may include whether a particular water heater is On or Off or on Standby, whether there are any errors and associated error code(s), an error history, a set point temperature, a run time, a flow rate, a combustion frequency, a heat exchange outlet temperature, and/or a water output temperature. Other status and control data are contemplated by this disclosure.

While the BMS gateway 100 and the water heater hub 106 are shown as separate components in the examples above, it is contemplated that the features and functions of the BMS gateway 100 and the water heater hub 106 may be integrated together in a single unit.

As a security feature, local controls for mechanical and electrical equipment managed by the BMS 104 are typically disabled or overwritten by the BMS 104 to prevent unintended changes to system settings or tampering of the equipment. However, coordination with a centralized BMS 104 may hinder local repair and servicing of the equipment by service technicians.

A local BMS user interface (UI) 120 is disclosed herein that is configured to connect with the BMS gateway 100 and facilitate secure access, display, and/or adjustment of water heater status and control data for the rack of water heaters connected to the BMS gateway 100. The BMS UI 120 may be a touch screen computing device or other computing device with a display and a user input device, such as via a mouse or keyboard. In various implementations, the BMS UI 120 may be a website hosted by the BMS gateway 100 and displayed on an external device, such as a cell phone, tablet, or other device. In the example shown in FIG. 2, the BMS UI 120 is connected to the BMS gateway 100 via the primary communication port 122. Because the primary communication port 122 is occupied by the BMS UI 120, the BMS gateway 100 is connected with the BMS 104 via a secondary communication cable 124, such as an RS-485 cable, that connects to an I/O port 126 on the BMS router 108.

Each BMS gateway 100 may be networked to up to a maximum number of water heaters based on the maximum number of I/O ports 114 on the water heater hub 106. In an example, the maximum number of water heaters that can be connected to the BMS gateway is six. In other examples, more or fewer than six water heaters may be the maximum number of water heaters that can be connected to the BMS gateway 100. The plurality of water heaters 102 connected to the BMS gateway 100, up to the maximum number of water heaters, is synonymously referred to herein as a rack of water heaters 102. However, it is understood that the rack of water heaters 102 may be installed together on a floor-standing or wall-mounted rack system, the rack of water heaters 102 may also be individually installed separate from a rack system (e.g., each water heater individually installed on one or more walls). Other installation configurations for the rack of water heaters 102 are contemplated by this disclosure.

For installations with more than the maximum number of water heaters, additional BMS gateways 100 may be installed, each connected to a different rack of water heaters 102. In the example shown in FIG. 3, a first BMS gateway 128 is connected to a first rack of water heaters 130 and a second BMS gateway 132 is connected to a second rack of water heaters 134. Each of the BMS gateways 128, 132 is in turn connected to a network switch 136, such as via Ethernet, that is in turn connected to the BMS 104. Accordingly, even in large installations, the BMS gateway 100 facilitates simplified installation and networking requirements.

In large installations, when multiple BMS gateways 100 are networked together through the switch 136, a single BMS UI 120 may also be connected to the switch 136 to facilitate local display and adjustment of water heater operational status and settings for all of the water heaters in the installation. In the example shown in FIG. 3, the BMS UI 120 facilitates local display and adjustment of water heater operational status and settings for all of the water heaters in the first and second rack of water heaters 130, 134.

Figure 6:
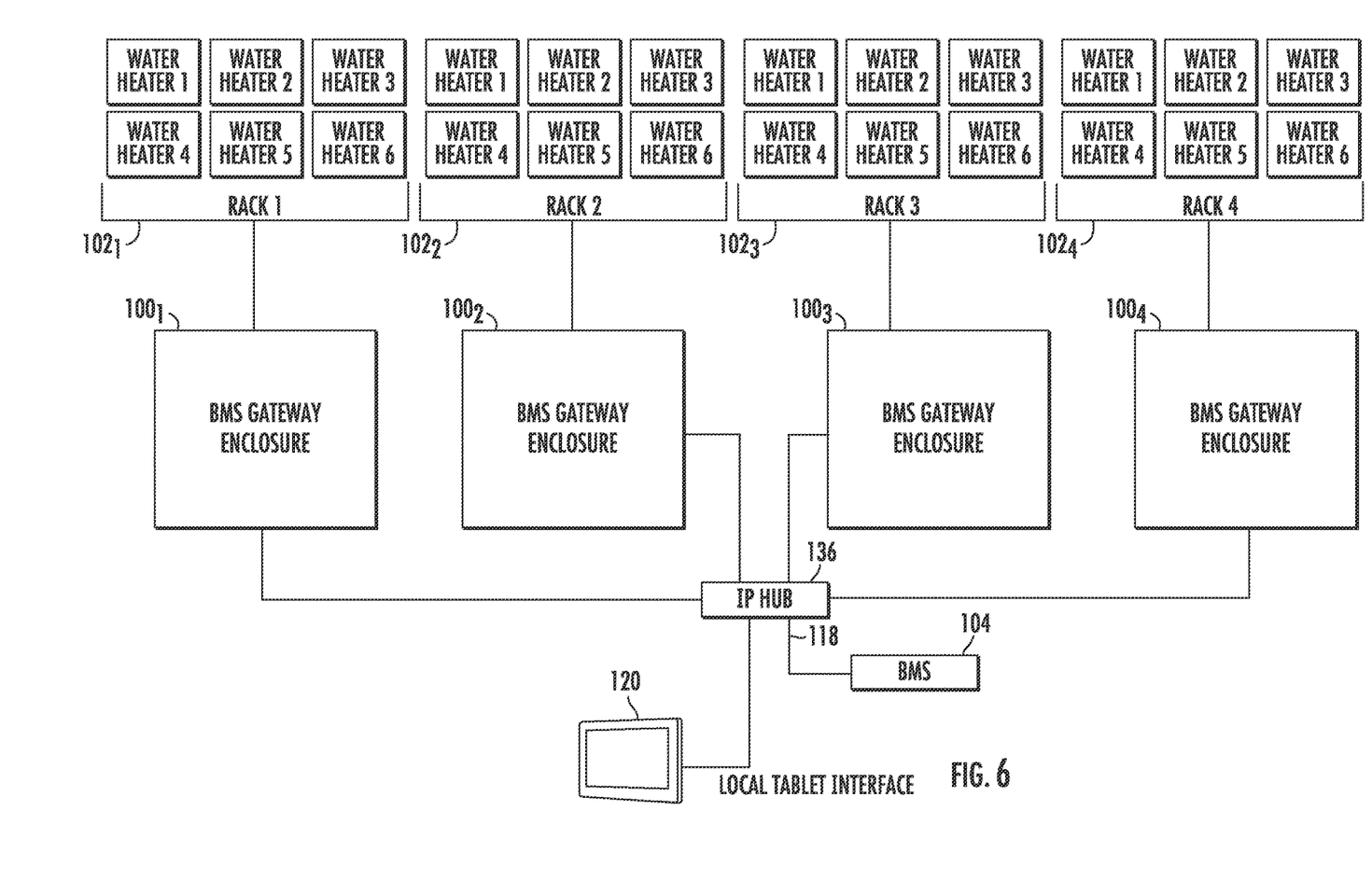
FIG. 6 is a plurality of BMS gateways connected through a network switch to a BMS suitable for implementing the several embodiments of the disclosure.

FIG. 6 shows another example of a plurality of the BMS gateways 100 connected through the network switch 136 to the BMS 104. As shown, four racks of water heaters $102_1$-$102_4$ are each connected to respective BMS gateways $100_1$-$100_4$. Each of the racks of water heaters $102_1$-$102_4$ have six water heaters. The BMS gateways $100_1$-$100_4$ are each connected to the network switch 136. The network switch 136 is in turn connected to the BMS 104 and the BMS UI 120. Accordingly, 24 water heaters are connected to the BMS 104 through a single communication cable 118, greatly reducing the networking and installation complexity of the system. Likewise, the BMS UI 120 facilitates local display and adjustment of water heater operational status and settings for all of the 24 water heaters connected thereto through the BMS gateways $100_1$-$100_4$.

Figure 4:
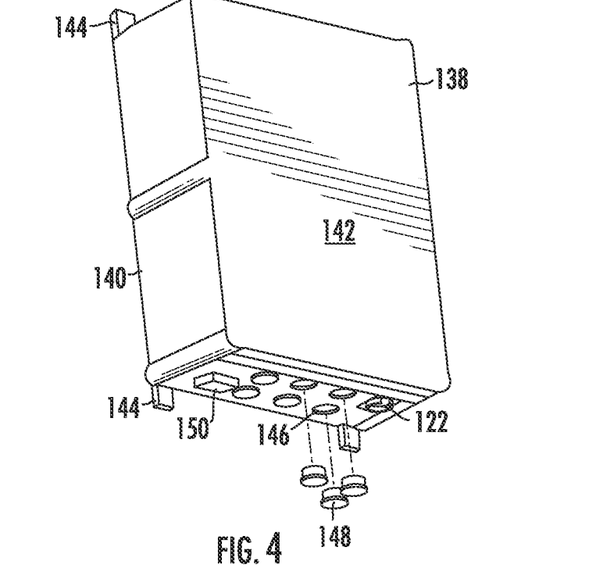
FIG. 4 is a perspective view of a housing assembly for the BMS gateway suitable for implementing the several embodiments of the disclosure.
Figure 5:
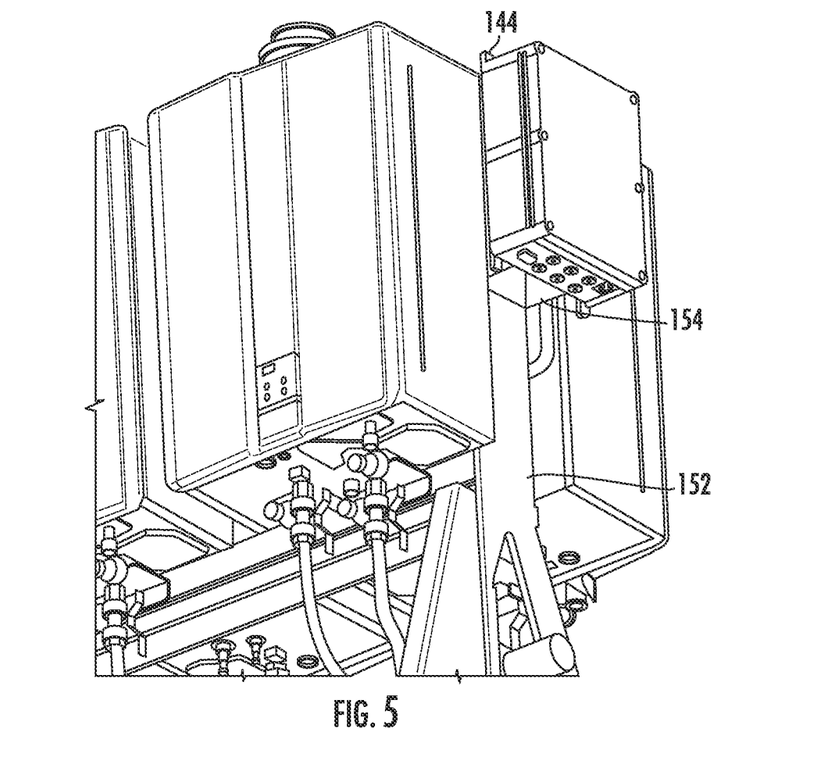
FIG. 5 is a perspective view of a water heater rack with a BMS gateway affixed thereto with a mounting bracket.

FIG. 4 is a perspective view of a housing assembly 138 for the BMS gateway 100 suitable for implementing the several embodiments of the disclosure. The housing assembly 138 comprises a frame 140 and a front cover 142. The frame 140 comprises a plurality of mounting tabs 144 for mounting the BMS gateway 100 to a structure, such as a wall or a water heater rack. As shown in the example of FIG. 5, the BMS gateway 100 may be mounted to a frame 152 of a rack to which a plurality of water heaters are installed. In an example, a u-shaped bracket 154 is affixed to the frame 152 and the mounting tabs 144 are affixed to the bracket 154, such as via one or more screws.

A bottom surface of the housing assembly 138 includes the primary communication port 122 and a plurality of secondary communication ports 146. Each of the secondary communication ports 146 is covered with a removable cap 148. Upon removal of the cap 148 one or more of the communication cables 110 may be inserted through the frame 140 for connecting the plurality of water heaters 102 to the water heater hub 106. Likewise, the secondary communication cable 124 may be fed through one of the secondary communication ports 146 for connecting the BMS router 108 to the BMS 104, such as shown in FIG. 2. The cap 148 may be maintained in any unused secondary communication ports 146. The frame 140 also includes a power port 150.

Figure 7:
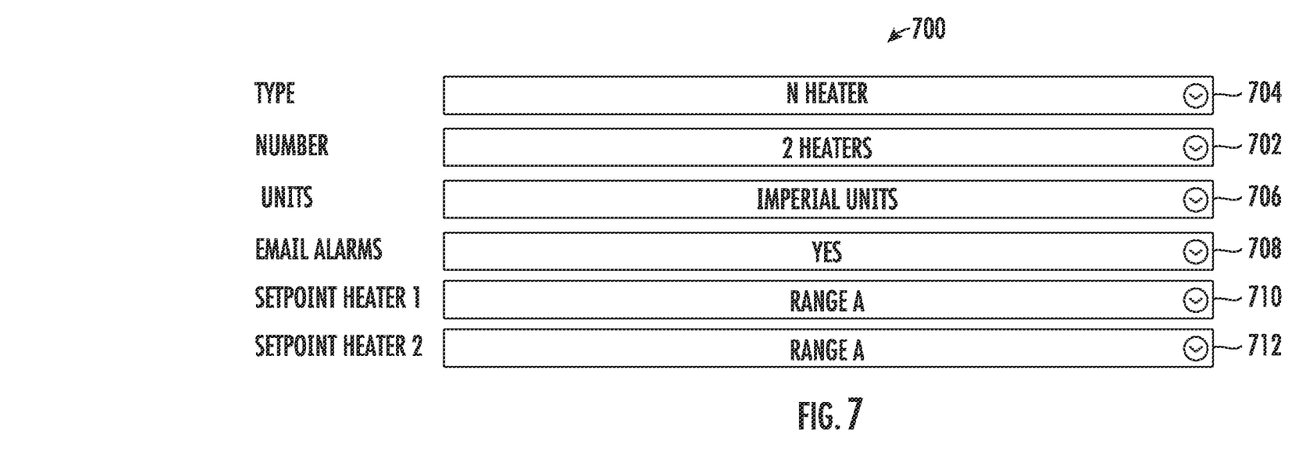
FIG. 7 is a UI screen of the BMS UI for configuring control and monitoring of a rack of water heaters suitable for implementing the several embodiments of the disclosure.

FIGS. 7-14 show various UI screens for the BMS UI 120. FIG. 7 is a rack configuration screen 700 of the BMS UI 200 for configuring control and monitoring of the rack of water heaters 120. The BMS UI 200 facilitates configuration of the BMS gateway 100 with the rack water heaters 120 connected thereto. For example, the rack configuration screen 700 of the BMS UI 200 is used to configure the type of water heaters in a rack of water heaters connected to the BMS gateway, the number of water heaters in the rack of water heaters, the type of units to display on the BMS UI (e.g., Imperial or Metric units), whether the BMS UI is to send e-mail alarms of errors or operational changes (e.g., changes to the set point on a water heater), and a setpoint for each of the heaters in the rack of water heaters.

In the example shown in FIG. 7, a drop down menu provides selectable options for each of the above parameters. For example, a number of water heaters drop down menu 702 provides a user with a list of numbers of water heaters included in the rack of water heaters 120 from 1 to the maximum number of water heaters in the rack of water heaters 120, such as 6 water heaters in various examples used herein. Likewise, a type of water heater drop down menu 704 provides selectable options of different types of water heaters. A units drop down menu 706 provides selectable options between imperial and metric units. An e-mail alarms drop down menu 708 provides options to receive alarms via e-mail for the rack of water heaters 102, or not. A set of setpoint drop down menus 710, 712 provide selectable options for the set point for each of the water heaters in the rack of water heaters 102. In the example shown, there are two setpoint drop down menus 710, 712 which correspond to the two heaters selected in the number of water heaters drop down menu 702.

Figure 8:
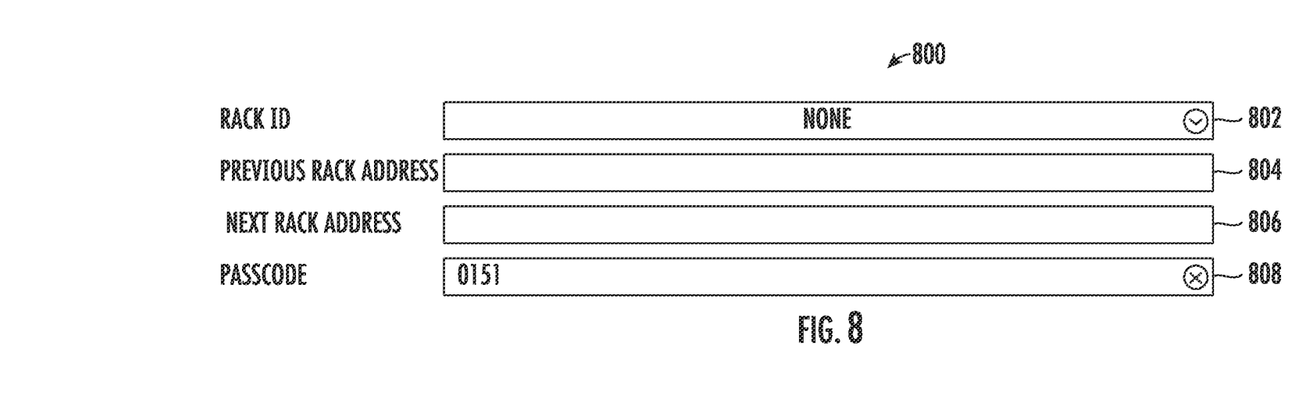
FIG. 8 is a UI screen of the BMS UI for configuring control and monitoring of a plurality of racks of water heaters suitable for implementing the several embodiments of the disclosure.

In large installations, when multiple BMS gateways 100 are networked together through the switch 136, a single BMS UI 120 may also be connected to the switch 136 to facilitate local display and adjustment of water heater operational status and settings for all of the water heaters in the installation. FIG. 8 is a rack system configuration screen 800 of the BMS UI 120 for configuring control and monitoring of a plurality of racks of water heaters 120, such as described above with reference to FIGS. 3 and 6. The rack system configuration screen 800 includes a rack identification (ID) drop down menu 802 for assigning a rack ID to one of the plurality of BMS gateways 100. A previous rack address field 804 and a next rack address field 806 are text entry fields for identifying a previous and next rack address for the plurality of BMS gateways 100. A passcode field 808 is a text entry field for defining a passcode for logging in to the current BMS gateway 100.

While drop-down menus are used in the examples above, other graphical user interface objects are contemplated by this disclosure, such as radio buttons, text fields, and the like.

Figure 9:
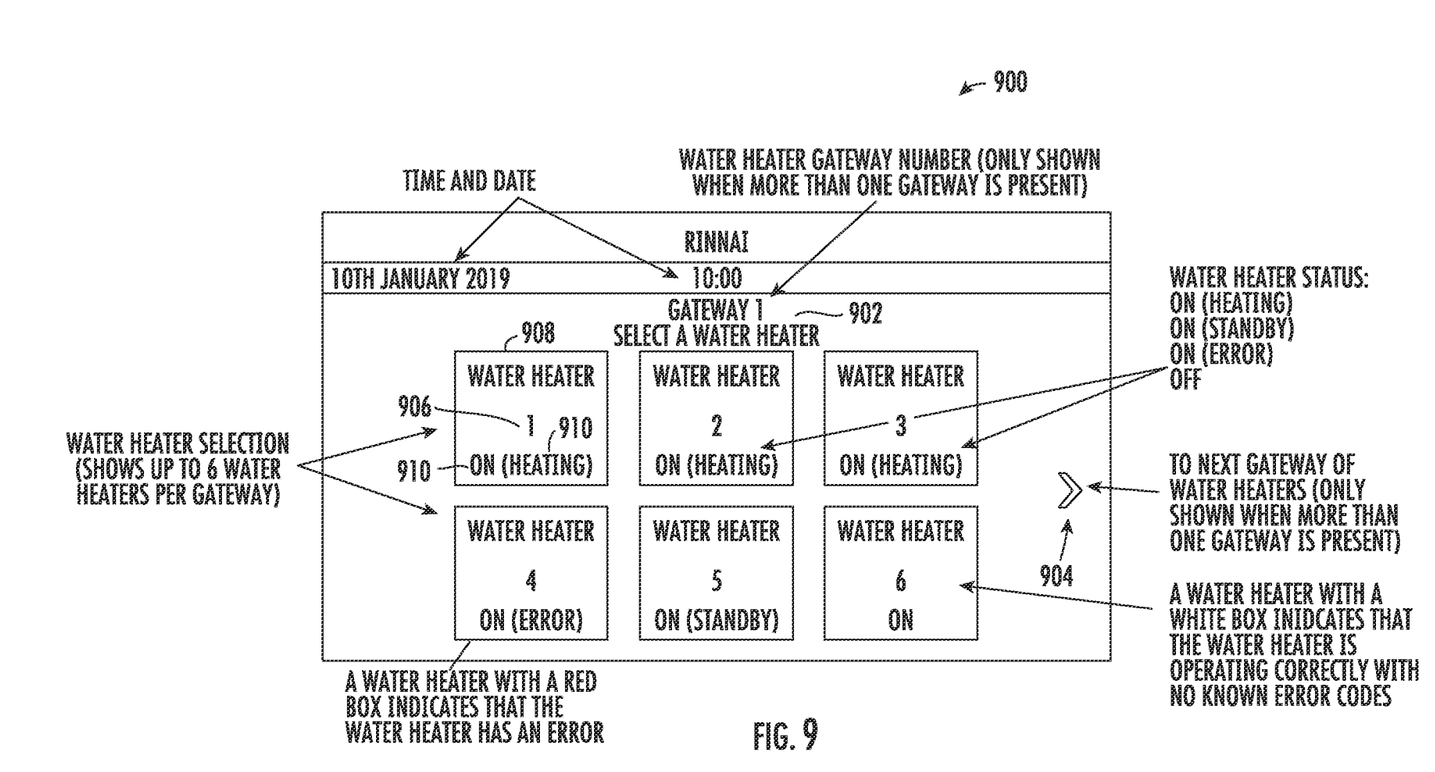
FIG. 9 is a UI screen of the BMS UI for displaying a status and controlling operation of a plurality of water heaters in a rack suitable for implementing the several embodiments of the disclosure.

FIG. 9 is a status screen 900 of the BMS UI 120 for displaying a status and for controlling operation of the plurality of water heaters 102 in a rack. In instances where more than one BMS gateway 100 is present, a gateway ID 902 specifies a currently selected BMS gateway 100 and associated rack of water heaters 102. An arrow icon 904 is selectable to navigate to the status screen 900 for other BMS gateways 100 in an installation where more than one is present. A plurality of water heater status areas 908 are provided on the status screen 900, each water heater status area 908 showing a status of a corresponding one of the plurality of water heaters 102. A water heater ID 906 is shown in each of the water heater status areas 908 and identifies a corresponding one the water heaters in the rack of water heaters 102. In the example shown, there are six water heaters in the rack of water heaters 102, each serially identified as water heater 1 through water heater 6. A status 910 in each of the water heater status areas 908 shows a current operational state of a corresponding one the water heaters in the rack of water heaters 102. For example, the operational state may be On or Off to indicate whether a water heater is turned on or off. In the On state, the water heater may have a sub-status 912 of heating for when the water heater is actively heating water, Standby for when the water heater is ready to begin heating water but not actively heating water, and Error for when the water heater is in an error state.

Figure 10:
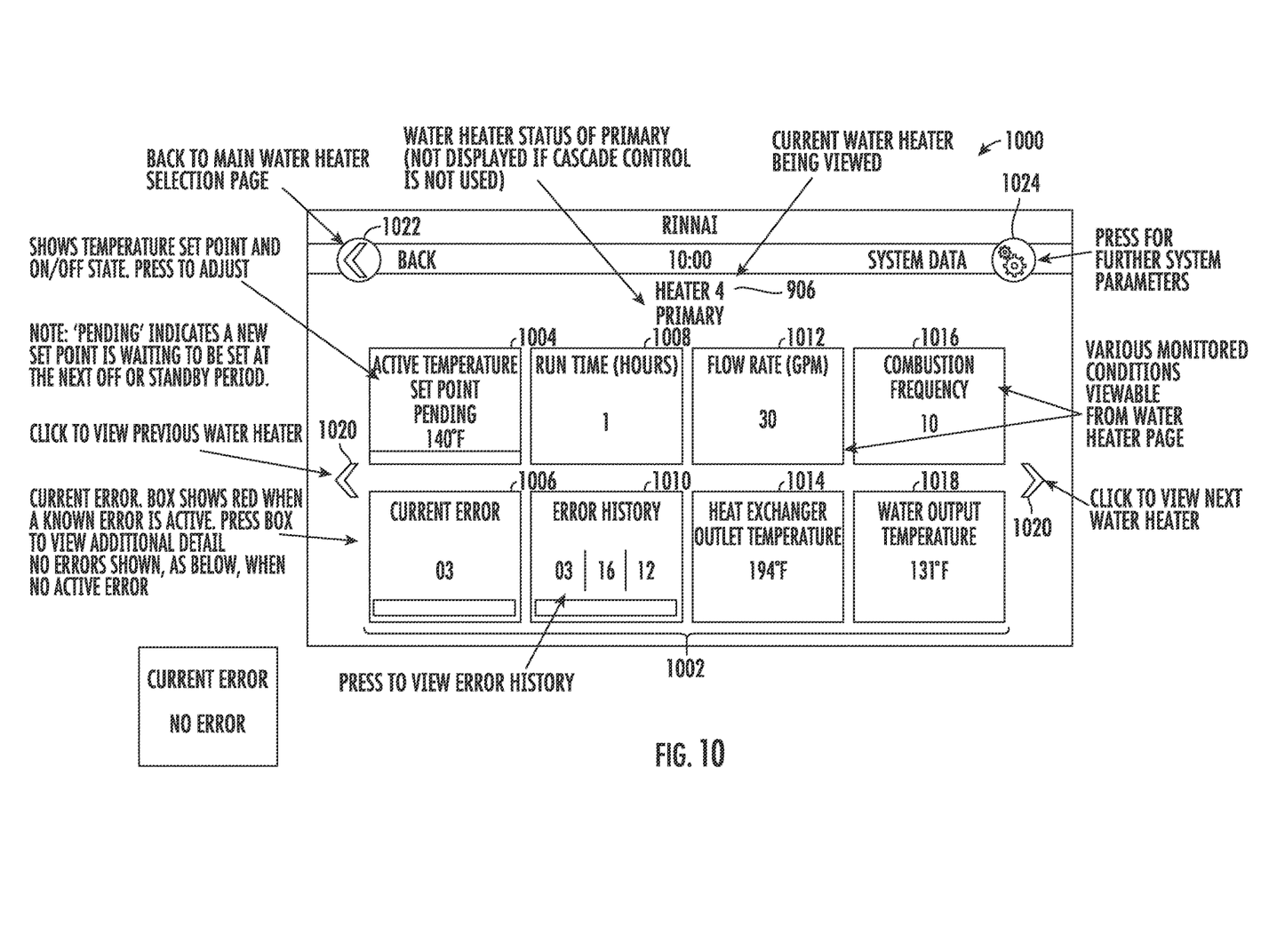
FIG. 10 is a UI screen of the BMS UI for displaying and controlling an operational status of a water heater suitable for implementing the several embodiments of the disclosure.
Figure 11:
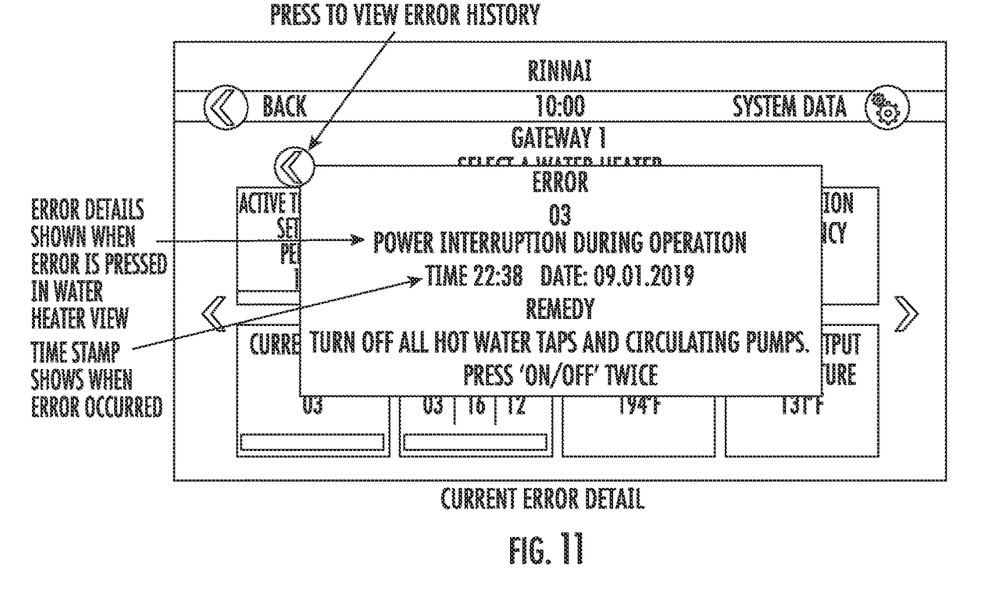
FIG. 11 is a UI screen of the BMS UI for displaying details of an error alert for a water heater suitable for implementing the several embodiments of the disclosure.
Figure 12:
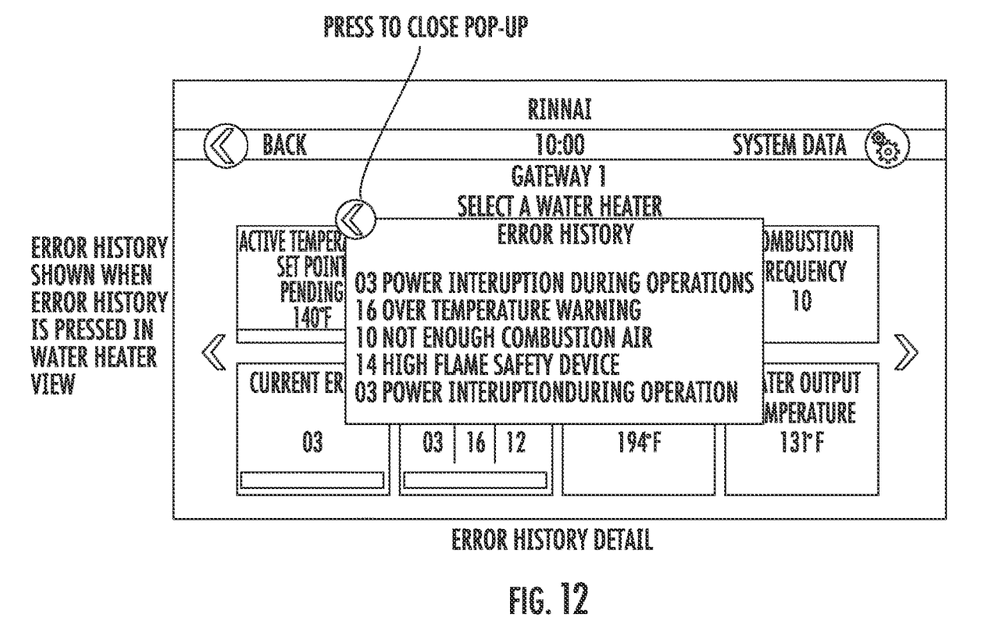
FIG. 12 is a UI screen of the BMS UI for displaying details of an error history for a water heater suitable for implementing the several embodiments of the disclosure.

Each of the water heater status areas 908 are selectable for obtaining more detailed information about the water heater identified by the water heater ID. FIG. 10 is an operational details screen 1000 of the BMS UI 120 for displaying and controlling an operational status of a water heater in the rack of water heaters 102. The operational details screen 1000 shows the water heater ID 906 for a currently selected water heater. Navigation arrows 1020 are selectable for navigating to other water heaters in the rack of water heaters 102. A back arrow 1022 is selectable for navigating back to the status screen 900. A system data icon 1024 is selectable for showing and specifying additional system data for the currently selected water heater.

The operational details screen 1000 provides more detailed information on the operational status of the selected water heater with a plurality of operational status areas 1002, each specifying an operational status value. For example, the operational status areas 1002 include a setpoint temperature area 1004, an error area 1006, a run time area 1008, an error history area 1010, a flow rate area 1012, a heat exchange outlet temperature area 1014, a combustion frequency area 1016, and a water output temperature area 1018.

One or more of the operational status areas 1002 in the operational details screen 1000 are selectable for changing a configuration of the selected water heater or obtaining more information on the operational detail. For example, upon selection of the error area 1006, a pop-up window shown in FIG. 11 may be displayed to provide information on the type of error, time and date of the error, and information on a remedy for the error. Upon selection of the error history area 1010, a pop-up window shown in FIG. 12 may be displayed to provide more details on the error history of the water heater, such as the timing and type of past errors for the water heater.

Figure 13:
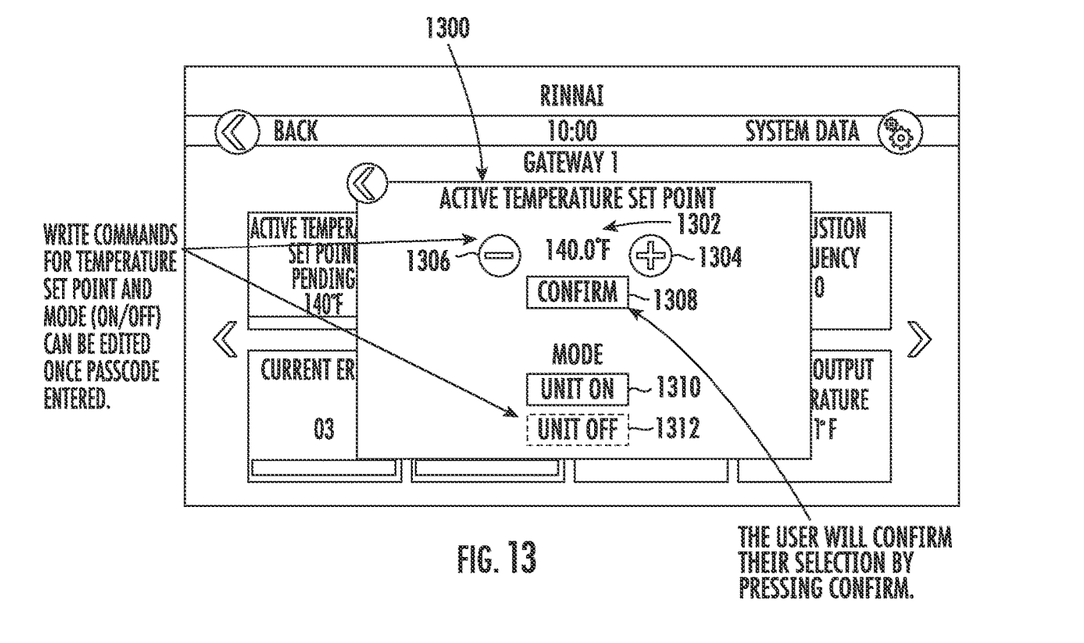
FIG. 13 is a UI screen of the BMS UI for displaying details of a set point and operational mode of a water heater suitable for implementing the several embodiments of the disclosure.
Figure 14:
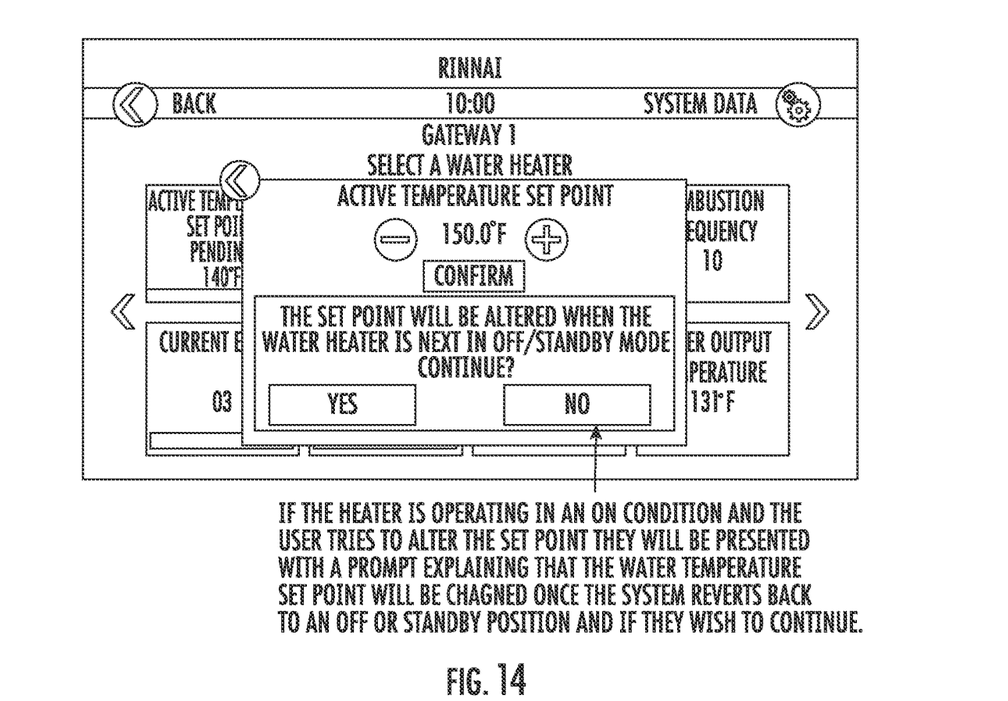
FIG. 14 is a UI screen of the BMS UI for confirming a change to the set point of a water heater suitable for implementing the several embodiments of the disclosure.

Upon selection of the set point temperature area 1004, the set point for the water heater may be updated, such as shown in FIGS. 13-14. In FIG. 13, a temperature set point screen 1300 shows a current setpoint temperature 1302, and plus 1304 and minus 1306 icons for changing the current setpoint temperature 1302. Upon adjusting the current setpoint temperature 1302 as desired, a confirmation button 1308 may be selected to confirm the desired set point temperature. In response, the pop up window shown in FIG. 14 is displayed when the water heater is On to verify that the setpoint temperature will be changed upon the water heater next entering the Off or Standby operational states. Additionally, the temperature set point screen 1300 shows the current operational mode as either On or Off in buttons 1310, 1312, respectively. Upon selection of the On button 1310, the water heater is turned on. Upon selection of the Off button 1312, the water heater is turned off. Other operational settings and status changes and displays are contemplated by this disclosure.

It should be appreciated that the logical operations described herein with respect to the various figures may be implemented (1) as a sequence of computer implemented acts or program modules (i.e., software) running on a computing device (e.g., the computing device described in FIG. 15), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 15:
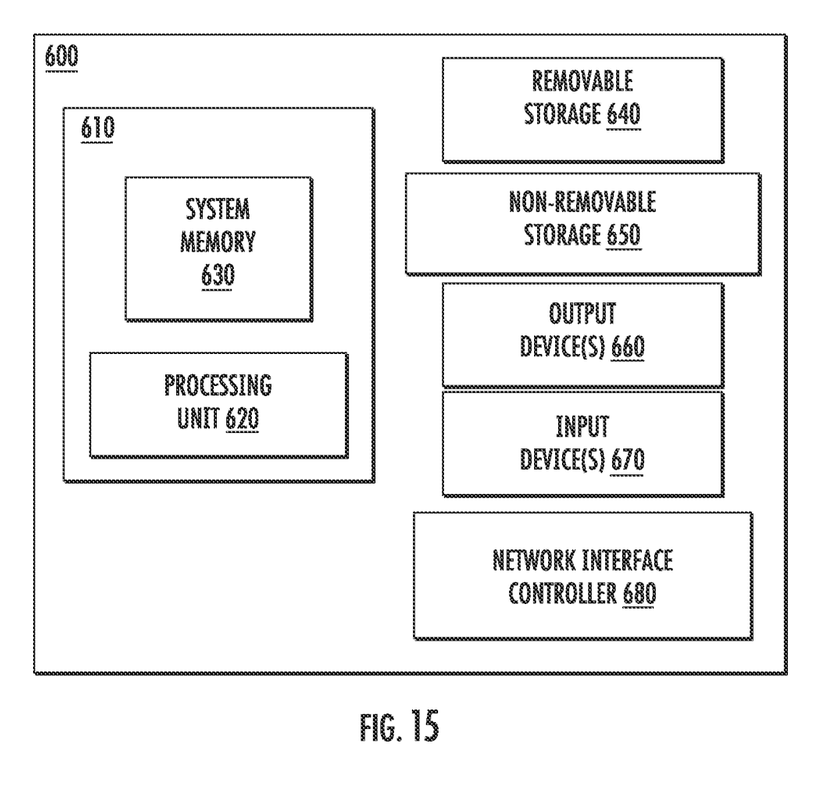
FIG. 15 is an exemplary computer system suitable for implementing the several embodiments of the disclosure.

Referring to FIG. 15, an example computing device 1500 upon which embodiments of the invention may be implemented is illustrated. For example, the controller system described herein may each be implemented as a computing device, such as computing device 1500. It should be understood that the example computing device 1500 is only one example of a suitable computing environment upon which embodiments of the invention may be implemented. Optionally, the computing device 1500 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 1500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 1500 to provide the functionality of a number of servers that is not directly bound to the number of computers in the computing device 1500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 1500 typically includes at least one processing unit 920 and system memory 930. Depending on the exact configuration and type of computing device, system memory 930 may be volatile (such as random access memory (RAM)), non-volatile (such as read-only memory (ROM), flash memory, etc.), or some combination of the two. This most basic configuration is illustrated in FIG. 15 by dashed line 1510. The processing unit 1520 may be a standard programmable processor that performs arithmetic and logic operations necessary for operation of the computing device 1500. While only one processing unit 1520 is shown, multiple processors may be present. Thus, while instructions may be discussed as executed by a processor, the instructions may be executed simultaneously, serially, or otherwise executed by one or multiple processors. The computing device 1500 may also include a bus or other communication mechanism for communicating information among various components of the computing device 1500.

Computing device 1500 may have additional features/functionality. For example, computing device 1500 may include additional storage such as removable storage 1540 and non-removable storage 1550 including, but not limited to, magnetic or optical disks or tapes. Computing device 1500 may also contain network connection(s) 1580 that allow the device to communicate with other devices such as over the communication pathways described herein. The network connection(s) 1580 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 1500 may also have input device(s) 1570 such as a keyboards, keypads, switches, dials, mice, track balls, touch screens, voice recognizers, card readers, paper tape readers, or other well-known input devices. Output device(s) 1560 such as a printers, video monitors, liquid crystal displays (LCDs), touch screen displays, displays, speakers, etc. may also be included. The additional devices may be connected to the bus in order to facilitate communication of data among the components of the computing device 1500. All these devices are well known in the art and need not be discussed at length here.

The processing unit 1520 may be configured to execute program code encoded in tangible, computer-readable media. Tangible, computer-readable media refers to any media that is capable of providing data that causes the computing device 1500 (i.e., a machine) to operate in a particular fashion. Various computer-readable media may be utilized to provide instructions to the processing unit 1520 for execution. Example tangible, computer-readable media may include, but is not limited to, volatile media, non-volatile media, removable media and non-removable media implemented in any method or technology for storage of information such as computer readable instructions, data structures, program modules or other data. System memory 1530, removable storage 1540, and non-removable storage 1550 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1520 may execute program code stored in the system memory 1530. For example, the bus may carry data to the system memory 1530, from which the processing unit 1520 receives and executes instructions. The data received by the system memory 1530 may optionally be stored on the removable storage 1540 or the non-removable storage 1550 before or after execution by the processing unit 1520.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A water heater system, comprising:
 a building management system (BMS) gateway, comprising:
  an appliance hub comprising a plurality of appliance communication ports, each of the plurality of appliance communication ports configured to communicate status and control data with a respective appliance; and
  a BMS router comprising a first communications port configured to communicate status and control data of a plurality of appliances between the appliance hub and the BMS router and a second communications port configured to communicate the status and control data of appliances connected to the plurality of appliance communication ports between the BMS router and an external BMS system remotely located from the BMS gateway.

2. The water heater system of claim 1, further comprising:
 a BMS user interface (UI) positioned local to the BMS gateway, the BMS UI coupled to the BMS gateway and configured to facilitate secure access, display, and/or adjustment of the status and control data for a plurality of appliances connected to the BMS gateway.

3. The water heater system of claim 2, wherein the BMS UI is coupled to a primary communications port of the BMS gateway.

4. The water heater system of claim 3, wherein the primary communications port is an Ethernet port.

5. The water heater system of claim 3, wherein the second communications port is configured to communicate with the BMS via a secondary communications port of the BMS gateway.

6. The water heater system of claim 2, wherein the BMS UI is coupled to the primary communications port of the BMS gateway via a network switch.

7. The water heater system of claim 6, a second BMS gateway coupled to the network switch, wherein the BMS UI is further configured to facilitate secure access, display, and/or adjustment of the status and control data for a plurality of appliances connected to the second BMS gateway.

8. The water heater system of claim 2, wherein the plurality of appliances are tankless water heaters.

9. The water heater system of claim 2, wherein the BMS UI comprises a status screen for displaying a plurality of status areas, each displaying an operational state of a respective one of the plurality of appliances connected to the BMS gateway.

10. The water heater system of claim 9, wherein upon selection of one of the plurality of status areas, the BMS UI is configured to display an operational details screen for displaying and controlling operational details of the respective one of the plurality of appliances.

11. The water heater system of claim 10, wherein the plurality of appliances are tankless water heaters and the operational details screen is configured to control changing a setpoint temperature on the respective one of the plurality of appliances.

12. A water heater system, comprising:
 a plurality of building management system (BMS) gateways, each BMS gateway is configured to be communicatively coupled with a rack of appliances and a BMS system remotely located from the plurality of BMS gateways, wherein each BMS gateway is configured to communicate status and control data between the BMS system and the rack of appliances communicatively coupled to the BMS gateway; and
 a BMS user interface (UI) positioned local to and communicatively coupled to the plurality of BMS gateways, the BMS UI is configured to facilitate secure access, display, and/or adjustment of the status and control data for the rack of appliances connected to each of the plurality of BMS gateways.

13. The water heater system of claim 12, further comprising:
 a network switch positioned local to the plurality of BMS gateways, wherein each of the plurality of BMS gateways and the BMS UI are communicatively coupled to each other via the network switch.

14. The water heater system of claim 13, wherein the plurality of BMS gateways and the BMS UI are communicatively coupled to the BMS system via the network switch.

15. The water heater system of claim 12, wherein the BMS UI comprises status screens, each for a respective one of the plurality of BMS gateways, wherein each of the status screens displays a plurality of status areas, the plurality of status areas each display an operational state of a respective one of the rack of appliances communicatively coupled to the respective one of the plurality of BMS gateways.

16. The water heater system of claim 15, wherein the BMS UI is configured to navigate between the status screens of the plurality of BMS gateways.

17. The water heater system of claim 16, wherein the status screen of each of the plurality of BMS gateways comprises an identifier of the respective one of the plurality of BMS gateways.

18. The water heater system of claim 15, wherein upon selection of one of the plurality of status areas, the BMS UI is configured to display an operational details screen for displaying and controlling operational details of the respective one of the rack of appliances in each of a plurality of operational detail areas.

19. The water heater system of claim 18, wherein the rack of appliances is a rack of tankless water heaters, and wherein the operational detail areas comprise one or more of a setpoint temperature area, an error area, an error history area, a run time area, a flow rate area, a heat exchanger outlet temperature area, a combustion frequency area, or a water outlet temperature area.

20. The water heater system of claim 19, wherein the operational detail areas comprise the setpoint temperature area, and wherein the BMS UI is configured to update a setpoint temperature of the respective one of the rack of appliances communicatively coupled to the respective one of the plurality of BMS gateways.

* * * * *